United States Patent
Hey et al.

[15] 3,653,827
[45] Apr. 4, 1972

[54] PRODUCTION OF WET PROCESS PHOSPHORIC ACID

[72] Inventors: Denis Hey, Mississauga; Alfred Johannes Dieterman, Clarkson (Mississauga), both of Ontario, Canada

[73] Assignee: Emery Industries (Canada), Ltd., Toronto, Ontario, Canada

[22] Filed: Aug. 29, 1969

[21] Appl. No.: 854,317

[52] U.S. Cl. ..............................23/165, 252/321, 252/358
[51] Int. Cl. ............................................................C01b 25/22
[58] Field of Search ...........................23/165; 252/321, 358

[56] References Cited

UNITED STATES PATENTS

| | | | |
|---|---|---|---|
| 2,089,212 | 6/1936 | Kritcheusky | 260/404 |
| 2,854,417 | 9/1958 | Edwards et al. | 252/358 |
| 3,238,142 | 3/1966 | Perry | 252/358 |
| 3,397,956 | 8/1966 | Buchanan et al. | 23/165 |
| 3,437,437 | 4/1969 | Dorwart | 23/165 |

Primary Examiner—Oscar R. Vertiz
Assistant Examiner—Gregory A. Heller
Attorney—John D. Rice and Gerald A. Baracka

[57] ABSTRACT

The yield of phosphoric acid in the "wet process" synthesis of said acid is improved by adding to the phosphate rock-sulfuric acid reaction medium a small but effective amount of a "-processing aid," which also serves as a defoaming agent, comprised of a mixture of (1) an amide of a lower alkanol amine and fatty acid and (2) fatty acid, in specifically defined proportions as determined by the specific components of the composition.

4 Claims, No Drawings

PRODUCTION OF WET PROCESS PHOSPHORIC ACID

This invention relates to a method of improving the process characteristics of the reaction and the yield obtained in the "wet process" synthesis of phosphoric acid.

More particularly, this invention concerns a novel composition comprising a mixture of (a) an amide of a monoalkanol amine and fatty acid and (b) fatty acid, in proportions determined by the structures of the components of the mixture, which is added in a small but effective amount at a suitable stage or suitable stages of the "wet process" phosphoric acid production system. The additive not only acts as a superior antifoaming agent therein but also unexpectedly serves as a "processing aid," significantly increasing the yield of phosphoric acid product. Additionally the "processing aid" improves the rate of calcium sulfate filtration. "Wet process" is used here to define all those methods which involve the reaction of phosphate-containing rocks with sulfuric acid and which result in some form of calcium sulfate as the predominant by-product. 69 objective by-product In the synthesis of phosphoric acid by the "wet process" techniques, phosphate rock (for example, apatite) which may be either calcined or uncalcined and which is in an appropriate state of subdivision, is reacted with sulfuric acid, of well established concentrations, at elevated temperatures, generally above 160° F. The various "wet process" methods differ somewhat but have in common the objective of producing by-product calcium sulfate crystals, consistent with a satisfactory phosphoric acid product yield, with properties which permit their practical separation. In the conventional dihydrate process an improved sulfate crystal structure is promoted by recycling the slurry so that median retention times of 27 hours in the attack tanks is not uncommon. The calcium sulfate is separated from the phosphoric acid product by filtration. The phosphoric acid filtrate may, if required or desired, be concentrated by suitable evaporation methods, single effect vacuum evaporators being generally used.

The entire wet phosphoric acid process, as briefly described above, is accompanied by excessive foam formation, with most of the usual uncalcined phosphate rocks. In the dihydrate process such foaming is most frequently encountered in the first attack tank but may also occur in other attack tanks and in the evaporation. The foam reduces capacity of the equipment and may result in overflows creating dangerous conditions for plant personnel. Various antifoam agents have been used to control foaming in the process, including tall oil fatty acids, oleic acids, sulfated tall oil fatty acids, sulfated oleic acid and silicones. U.S. Pat. No. 3,437,437, to G. E. Dorwart, Apr. 8, 1969, discloses the use of the reaction product of one mole of a hydroxyl amine and 1 to 4 moles of fatty acid. Analysis has shown this described reaction product to be a mixture of amide, amide-ester and amine ester structures, and unreacted fatty acid.

We have now discovered a novel composition that serves as an unusually effective processing aid in the "wet process" manufacture of phosphoric acid. The composition comprises a mixture, in defined proportions, of (a) the essentially pure amide of certain lower alkanol amines and fatty acid and (b) free fatty acid. The composition of this invention, when charged in small but effective amounts into the "wet process" phosphoric acid production system, is not only a more effective antifoam agent than the compositions previously used for this purpose, but unexpectedly improves the rate of filtration of the by-product calcium sulfate. This results in shorter filtration times required for separation of the calcium sulfate slurry. The most important advantage of this invention, however, is that the presence of the new composition in the reaction medium significantly increases the yield of phosphoric acid. For example, in a close simulation in the laboratory of the conventional commercial dihydrate process, the yield of phosphoric acid, as measured by the recovery of $P_2O_5$ values based on that in the feed rock, ranges from about 88 to 92.4 percent yield of $P_2O_5$. The use of the compositions embodied herein, in accordance with the present invention, increases the phosphoric acid yield, sometimes up to the theoretical limit of 100 percent $P_2O_5$ yield, depending on the amount of the processing aid used. However, even a minor increase in the yield is significant and assumes major economic importance when the massive production of "wet process" phosphoric acid is taken into account. It is reported that there are more than 40 "wet process" acid plants in operation in the United States and Canada accounting for the processing of several million tons of phosphate rock.

The composition of this invention is comprised of a mixture of

A. monocarboxylic acid having from 12 to 22 carbon atoms and a melting point below about 60° F., and
B. a monoalkanolamide of monocarboxylic acid as set forth in (A) and a monoalkanolamine selected from the group consisting of (i) monoethanolamine, (ii) isopropanolamine, (iii) n-propanolamine, and (iv) N-(aminoethyl)ethanolamine, the proportions, in weight percent, of (A) and (B) in said mixture being:
   a. 78 to 95 percent of (A) and 5 to 22 percent of (B) when the amide derives from (i);
   b. 80 to 84 percent of (A) and 16 to 20 percent of (B) when the amide derives from (ii);
   c. 55 to 76 percent of (A) and 24 to 45 percent of (B) when the amide derives from (iii);
   d. 75 to 82 percent of (A) and 18 to 25 percent of (B) when the amide derives from (iv);

Representative of the well known monocarboxylic acids falling within the aforesaid designations are the unsaturated fatty acids, myristoleic, palmitoleic, oleic, linoleic, linolenic ricinoleic and the saturated fatty acid iso-stearic acid (a product of Emery Industries) and the like. The acids can be used alone or in any desired mixture thereof. Tall oil fatty acids, which comprise predominantly unsaturated fatty acids, are the preferred source of the fatty acid component, primarily due to their low cost but also because of the outstanding performance of the composition derived therefrom in the phosphoric acid process.

The preferred composition embodied herein contains from 15 to 20 parts by weight of the monoethanolamide derived from tall oil fatty acids (for example Pamak C6, a product of Hercules Inc.) and from 85 to 80 parts by weight of the tall oil fatty acids in admixture therewith.

The amides of the present invention are prepared by reacting the alkanol amine with fatty acid in such a way as to effectively inhibit the formation of ester and/or amide-ester products and thus produce a composition which is essentially the completely amidated reaction product of the alkanolamine and the fatty acid. This is best accomplished by reacting approximately equimolar quantities of the alkanolamine and the acid at a temperature range of about 320° to 356° F. until essentially the theoretical amount of water of reaction has been recovered from the reaction system and the acid number is in the range of about 1 to 6.0, in the absence of acidic materials that serve as esterification catalysts. The reaction is generally carried out at atmospheric pressure but, if desired, reduced pressures can be employed at the end to complete the reaction and to remove any residual water of reaction. The esterified products content of the amide composition will be less than about 6 percent by weight. The amide product is then admixed with an amount of free fatty acid in the proportions previously set forth to prepare the processing aid of this invention.

In accordance with this invention, the described processing aid is added in small but effective amount to be the "wet process" phosphoric acid production system to increase phosphoric acid yield and, when required, to suppress foaming. The processing aid is effective in reactions utilizing any of many different grades of calcined and uncalcined rock, for example, having BPL contents of from 62 to 82 percent. (This refers to the phosphate content expressed in amount of $Ca_3(PO_4)_2$). Such rock has a phosphate content expressed in terms of $P_2O_5$ of from 28.5 to 37.6 percent by weight of $P_2O_5$. Additionally, the processing aid is effective in reactions employing so-called "unground" rock as well as ground rock and the mixtures thereof. Because of the continuous manner in which increasing amounts of the processing aid enhance the $P_2O_5$ yield, the amount of processing aid used is determined by weighing against each other the economic advantages to be gained from the improved yield against the cost of the processing aid. Currently, the preferred amount of this basis is in the range of about 1 to about 5 pounds of processing air per ton of $P_2O_5$ in the rock. Larger amounts, e.g., up to 10 pounds or more, may be used but such an excess is not practical.

Representative examples are next set forth to illustrate the advantages of this invention. The processing aid is compared with typical and, in some cases, superficially similar compositions used in the phosphoric acid process. Comparisons are also included with compositions not having the essential constituents to point up the specificity and criticality of the claimed compositions.

Defoaming and antifoaming properties of the processing aids are measured by the following test method which has been found to correlate with commercial operations. Eighty-eight grams of recycle phosphoric acid (approximately 25 percent $P_2O_5$ equivalent content) and a measured amount of processing aid are charged to a 1 liter graduated cylinder equipped with an 80 r.p.m. stirrer, and maintained at a temperature of 158° F. Phosphate rock (64 grams) is added and the slurry is stirred to fully wet the rock. Sulfuric acid (94 grams, 56 percent) is rapidly introduced with stirring and the total system volume versus time is plotted to determine maximum foam evolution and rate of change of foam volumes. The foam volume is the total volume less 180 ml. (the volume of reactants, etc.). In an alternative method, the procedure is the same as above except that a regulated flow of air (600 ml./min.) is blown through a sintered glass frit at the bottom of the graduate cylinder through the sample and the maximum volume of foam after one minute is recorded.

To determine the value of the processing aids in increasing phosphoric acid yield, an experimental design was developed which closely represents commercial practice in the dihydrate process. This model was chosen since it represents the dominant commercial practice. However, since the other variants of the "wet process," such as the hemihydrate process and the anhydrite process, at some point prior to filtration convert the by-product calcium sulfate to the dihydrate form, the yield improvements found with the adopted test method are also applicable to these process variants. To a mixture of a measured amount of the processing aid and 250 grams of recycle phosphoric acid heated to 140° F. is added 175 grams of phosphate rock. 280 grams of 56 percent sulfuric acid is added at the rate of 80 grams per minute. The reaction medium is stirred at 158° to 176° F. for 6 hours (reaction times of up to 27 hours have been studied with no essential difference in results) and the slurry is vacuum filtered to separate the calcium sulfate by-product. The filter cake is washed with 200 grams of 15 percent $P_2O_5$ equivalent phosphoric acid diluted from recycle acid, then 200 grams of 5 percent $P_2O_5$ equivalent phosphoric acid diluted from recycle acid, and finally with water. The percentage yield of $P_2O_5$ based on that available in the feed rock is readily calculated by recording the weights of all charges and products and determining the $P_2O_5$ contents of all feeds and filtrates according to conventional analytical techniques. Special attention is paid to the $P_2O_5$ content of the primary filtrate since this filtrate, after evaporation, is the phosphoric acid product.

In the examples, amounts of ingredients are expressed in parts by weight unless otherwise indicated.

EXAMPLE 1

A processing aid typical of those embodied in this invention is prepared as follows. The monoethanolamide of tall oil fatty acids is prepared by reacting one mole of tall oil fatty acids (for example Pamak C6, a product of Hercules Incorporated) with one mole of monoethanolamine at 320° to 356° F. till about one mole of water of reaction has been collected and the acid number is below 5. A four hour reaction time is generally satisfactory for this purpose. Twenty parts of the amide product is blended with 60 parts Pamak C6 and 20 parts of crude oleic acid. The resulting product is tested as a yield improver in the conversion of 75% BPL Florida Rock (34.42 percent $P_2O_5$ equivalent) to phosphoric acid at various concentrations with the following results:

| Processing aid concentration in lb./ton $P_2O_5$ Phosphate Rock | Percent $P_2O_5$ yield based on $P_2O_5$ in Phosphate Rock |
| --- | --- |
| (control, no processing aid) | (88.2) |
| 1 | 90.7 |
| 2 | 90.5 |
| 3 | 92.2 |
| 3.5 | 93.3 |
| 4 | 93.1 |
| 5 | 93.5 |
| 6 | 94.9 |

EXAMPLE 2

The monoethanolamide of tall oil fatty acids (Pamak C6B) is produced as in Example 1. The amide reaction product is blended in various proportions with Pamak C6B. The resulting product is tested as a yield improver in the conversion of a different batch of 75 percent BPL Florida Rock to phosphoric acid at a concentration of 3.5 lbs./ton $P_2O_5$ in the rock.

| % Monoethanolamide in the processing aid | Percent $P_2O_5$ yield based on $P_2O_5$ in the Phosphate Rock |
| --- | --- |
| (control, no processing aid) | (92.4) |
| 10 | 93.3 |
| 13 | 94.0 |
| 17.5 | 96.6 |
| 20 | 96.6 |
| 25 | 89.3 |
| 35 | 89.5 |
| 100 | 90.5 |

EXAMPLE 3

The mono n-propanolamide of Pamak C6B is produced as in Example 1 and employed in experiments identical with those of Example 2.

| % Mono-n-propanolamide in the Processing Aid | Percent $P_2O_5$ yield based on $P_2O_5$ in the Phosphate Rock |
| --- | --- |
| (control, no processing aid) | (92.4) |
| 10 | 86.2 |
| 15 | 88.1 |
| 20 | 91.5 |
| 25 | 92.6 |
| 30 | 93.8 |

EXAMPLE 4

The mono-iso-propanolamide of Pamak C6B is produced as in Example 1 and employed in experiments identical with those of Example 2.

| % Mono-iso-propanolamide in the Processing Aid | Percent $P_2O_5$ yield based on $P_2O_5$ in the Phosphate Rock |
| --- | --- |

| (control, no processing aid) | (92.4) |
|---|---|
| 15 | 92.0 |
| 18 | 94.6 |
| 20 | 92.5 |

EXAMPLE 5

The N-(ethylamino) monoethanolamide of Pamak C6B is produced as in Example 1 and employed in experiments identical with those of Example 2. A composition containing 20 parts by weight of the amide product and 80 parts by weight of Pamak C6B gives a percent $P_2O_5$ yield based on $P_2O_5$ content in the phosphate rock of 93.5 compared with the control yield of 92.4.

EXAMPLE 6

The monoethanolamide of the saturated fatty acid iso-stearic acid is produced as in Example 1 and after mixing with Pamak C6B tested in a manner identical to that set forth in Example 2. A composition containing 20 parts by weight of the amide reaction product and 80 parts by weight Pamak C6B gives a percent $P_2O_5$ yield based on $P_2O_5$ content in the phosphate rock of 95.3 compared with the control yield of 92.4.

EXAMPLE 7

The processing aid of Example 1 is used in the conversion to phosphoric acid of non-foaming calcined rock of 74 to 75 percent BPL content. An essentially quantitative yield of phosphoric acid is obtained in the presence of 3.5 lb./ton of processing aid per ton of $P_2O_5$ in the rock. The control experiment, i.e., no processing aid, gives a yield of 94.2 percent $P_2O_5$ based on the $P_2O_5$ content of the rock.

EXAMPLE 8

The processing aid of Example 1 is used in the conversion to phosphoric acid of mixtures of ground and unground calcined rock. The amount of processing aid used is 3.5 lb./ton $P_2O_5$ in the rock.

| Rock Mixture | | Percent $P_2O_5$ Yield Based on $P_2O_5$ in Phosphate Rock | |
|---|---|---|---|
| Parts Ground | Parts un-ground | No process aid | Process aid |
| 0 | 100 | 87.4 | 92.3 |
| 30 | 70 | 94.2 | 97.8 |
| 70 | 30 | 92.8 | 98.4 |
| 100 | 0 | 94.2 | 100 |

EXAMPLE 9

The amide reaction product of monoethanolamine and Pamak C6B is produced according to Example 1 and 20 parts of this product is mixed with 80 parts Pamak C6B to obtain the processing aid. The influence of the processing aid on the time required to filter the phosphoric acid reaction mixture is investigated. The reaction is carried out by the yield procedure already described. Vacuum filtrations are carried out at a controlled reduced pressure and the elapsed time is noted between commencement of a filtration and the spontaneously occurring, manometrically registered, break-in-vacuum which indicates the end of filtration. The processing aid is used at 3.5 lb./ton of $P_2O_5$ in the rock (a 75 percent BPL Florida Rock sample). A blank control experiment is also run.

| Filtration | Control | | With Processing Aid | |
|---|---|---|---|---|
| | Time in Seconds | Weight in Grams of $P_2O_5$ | Time in Seconds | Weight in Grams of $P_2O_5$ |
| Primary | 12 | 22.9 | 5 | 32.8 |
| First Wash | 40 | 59.2 | 26 | 69.2 |
| Second Wash | 35 | 58.5 | 21 | 44.6 |
| Third Wash | 28 | 19.2 | 19 | 15.9 |

The above results demonstrate improved filtration and improved $P_2O_5$ product recovery using the processing aid of the invention.

EXAMPLE 10

The data in this example illustrate the superior antifoam properties of representative compositions of this invention compared with superficially similar compositions and commercially available antifoam agents. Samples A and B and R embody the compositions of the invention.

A - mixture of 20 parts of amide product of molar equivalents of monoethanolamine and tall oil fatty acids and 80 parts of tall oil fatty acids (Pamak C6).

B - processing aid as described in Example 1.

C - tall oil fatty acids, 10 percent sulfated, neutralized with NaOH.

D - tall oil fatty acids, 10 percent sulfated, neutralized with triethanolamine.

E - tall oil fatty acids, 10 percent sulfated, neutralized with monoethanolamine.

F - tall oil fatty acids, 10 percent sulfated, neutralized with $NH_4OH$.

G - Oleic acid, 10 sulfated, neutralized with NaOH.

H - tall oil fatty acids (Pamak C4).

I - tall oil fatty acids (Pamak C10).

J - reaction product of 80 parts by weight oleic acid and 20 parts by weight diethanolamine.

K - reaction product of equimolar quantities of oleic acid and diethanolamine.

L - reaction product of 80 parts by weight oleic acid and 20 parts by weight monoethanolamine.

M - 80 parts oleic acid and 20 parts of K composition.

N - reaction product of 80 parts by weight tall oil fatty acids and 20 parts by weight monoethanolamine.

O - reaction product of 80 parts by weight tall oil fatty acids and 10 parts by weight monoethanolamine.

P - amide product of diethanolamine and tall oil fatty acids.

Q - ester product of triethanolamine bottoms and tall oil fatty acids.

R - amide product of N(ethylamino) monoethanolamine and tall oil fatty acids.

S - Arizona Chemicals Co. No. 302 (73 percent tall oil fatty acids, 4 percent rosin acids, 13 percent glycerol monoester and 10 percent mineral oil by analysis).

T - Hercules Inc. Defoamer 1052.

U - Swift Defoamer 67 (93 percent crude oleic, 7 percent sulfonated hydrocarbons by analysis).

The antifoaming characteristics of the foregoing compositions in the wet phosphoric acid process are determined at a concentration of about 2 pounds additive per ton of $P_2O_5$ in the phosphate rock, with the following results:

| Composition | Foam Volume, ml. |
|---|---|
| Control (no processing and/or antifoam agent) | 320 |
| A | nil |
| B | ≈10 |
| C | 30 |
| D | 50 |
| E | 50 |
| F | 50 |
| G | 55 |
| H | 90 |
| I | 90 |
| J | 70 |
| K | 60 |

| | |
|---|---|
| L | 40 |
| M | 50 |
| N | 100 |
| O | 50 |
| P | 110 |
| Q | 50 |
| R | -20 |
| S | 60 |
| T | 120 |
| U | 40 |

EXAMPLE 11

This example illustrates the combined effects of the processing aid of this invention as both a yield improver and a foam suppressant. The representative processing aids are as follows:

A - mixture of 80 parts of tall oil fatty acids and 20 parts of the amide product of monoethanolamine and tall oil fatty acids.

B - mixture of 80 parts iso-stearic acid and 20 parts of the amide product of monoethanolamine and iso-stearic acid. The processing aids are tested at concentrations of 3.5 lb./ton of $P_2O_5$ in the phosphate rock with these results.

| Processing Aid | Phosphoric Acid (% $P_2O_5$) Yield | Observations |
|---|---|---|
| none (control) | 92.4 | extensive and serious foaming |
| A | 96.6 | essentially no foaming |
| B | 95.3 | 80% of foam eliminated |

EXAMPLE 12

In this example the processing aid of the invention is evaluated as a wet process phosphoric acid yield improver compared with the antifoaming compositions disclosed by G. E. Dorwart in U.S. Pat. No. 3,437,437.

SAMPLE A

A hydroxy amine-fatty acid condensation product is prepared according to the method of Example 1 of U.S. Pat. No. 3,437,437; a mixture of four moles of tall oil fatty acids (Pamak C6B) and one mole monoethanolamine ($H_2NCH_2CH_2OH$) is reacted at 400° F. for six hours under a reduced pressure of 23 mm. Hg. From the analysis of the reaction product as follows, acid number 91.2; hydroxyl number 16.7; saponification number =51.8, the composition of the reaction product is determined to be:

a. 10.6 percent monoethanolamide

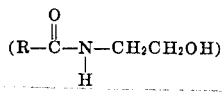

b. 11.8 percent amide-ester

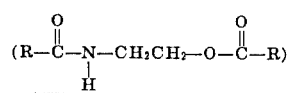

c. 26.4 percent amine ester

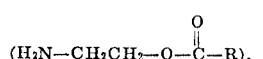

where R is the residue of the fatty acid moiety, and d. 51.2 percent unreacted fatty acid.

SAMPLE B

The synthesis method is revised somewhat from that of sample A using the same ratio of reactants. Four moles of the tall oil fatty acids (Pamak C6B) are reacted with one mole of monoethanolamine at 337° F. at atmospheric pressure with continual removal of the water by distillation. The reaction is terminated in 20 minutes after one mole of by-product water has been collected. Analysis of the product, acid number = 110.9; hydroxyl number =29.8; saponification number =25.1, shows its composition to be:

a. 18.5 percent amide
b. 7.7 percent amide-ester
c. 12.3 percent amine ester
d. 61.5 percent unreacted acid.

Example C

One mole of monoethanolamide is reacted with one mole of tall oil fatty acids (Pamak C6B) at 320° C. for about 4 hours at atmospheric pressure. Twenty parts of the resulting amide reaction product is blended with 80 parts of tall oil fatty acids and analysis of the mixture, acid number =144.1; hydroxyl number=33.1; shows the composition to be:

a. 20.5 percent monoethanolamide
b. 0.8 percent amide-ester and amine ester
c. 78.7 percent free fatty acid Thus, the non-fatty acid portion of this representative composition of the invention is essentially the amide product, free of any significant amount of esterification products.

The foregoing compositions are tested as processing aids in the wet acid process at a concentration of 3.5 lb/ton of equivalent $P_2O_5$ in 75 percent BPL phosphate rock. The results show the surprising advantages of the present invention.

| Processing aid | Phosphoric Acid (% $P_2O_5$) Yield |
|---|---|
| Control (none) | 92.4 |
| A | 89.2 |
| B | 92.0 |
| C | 96.6 |

We claim:

1. A method of increasing the phosphoric acid yield, and for inhibiting foaming in a phosphate rock and sulfuric acid reaction medium employed in the synthesis of phosphoric acid, which comprises adding to the reaction medium an effective amount of a composition consisting essentially of a mixture of (A) monocarboxylic acid having from 12 to 22 carbon atoms and a melting point below about 60° F., and (B) a monoalkanolamide of monocarboxylic acid as set forth in (A) and a monoalkanol amine selected from the group consisting of (i) monoethanolamine, (ii) isopropanolamine, (iii) n-propanolamine, and (iv) N-(aminoethyl)ethanolamine, the proportions, in weight percent, of (A) and (B) in said mixture being:

a. 78 to 95 percent of (A) and 5 to 22 percent of (B) when the amide derives from (i);
b. 80 to 84 percent of (A) and 16 to 22 percent of (B) when the amide derives from (ii);
c. 55 to 76 percent of (A) and 24 to 45 percent of (B) when the amide derives from (iii);
d. 75 to 82 percent (A) and 18 to 25 percent of (B) when the amide derives from (iv).

2. A method according to claim 1 wherein there is added to said reaction medium from about 1 to 5 pounds of said composition per ton of $P_2O_5$ in the phosphate rock.

3. A method according to claim 1 wherein the monocarboxylic acid of (A) and (B) of said composition is tall oil fatty acids.

4. A method according to Claim 3 wherein said composition is comprised of 80 to 85 percent (A) and 15 to 20 percent (B), the amide, being derived from monoethanolamine.